Nov. 20, 1951     J. W. DANIELS     2,576,001
SELF-LOADING AND UNLOADING AUTO TRUCK
Filed Jan. 25, 1949     4 Sheets-Sheet 1
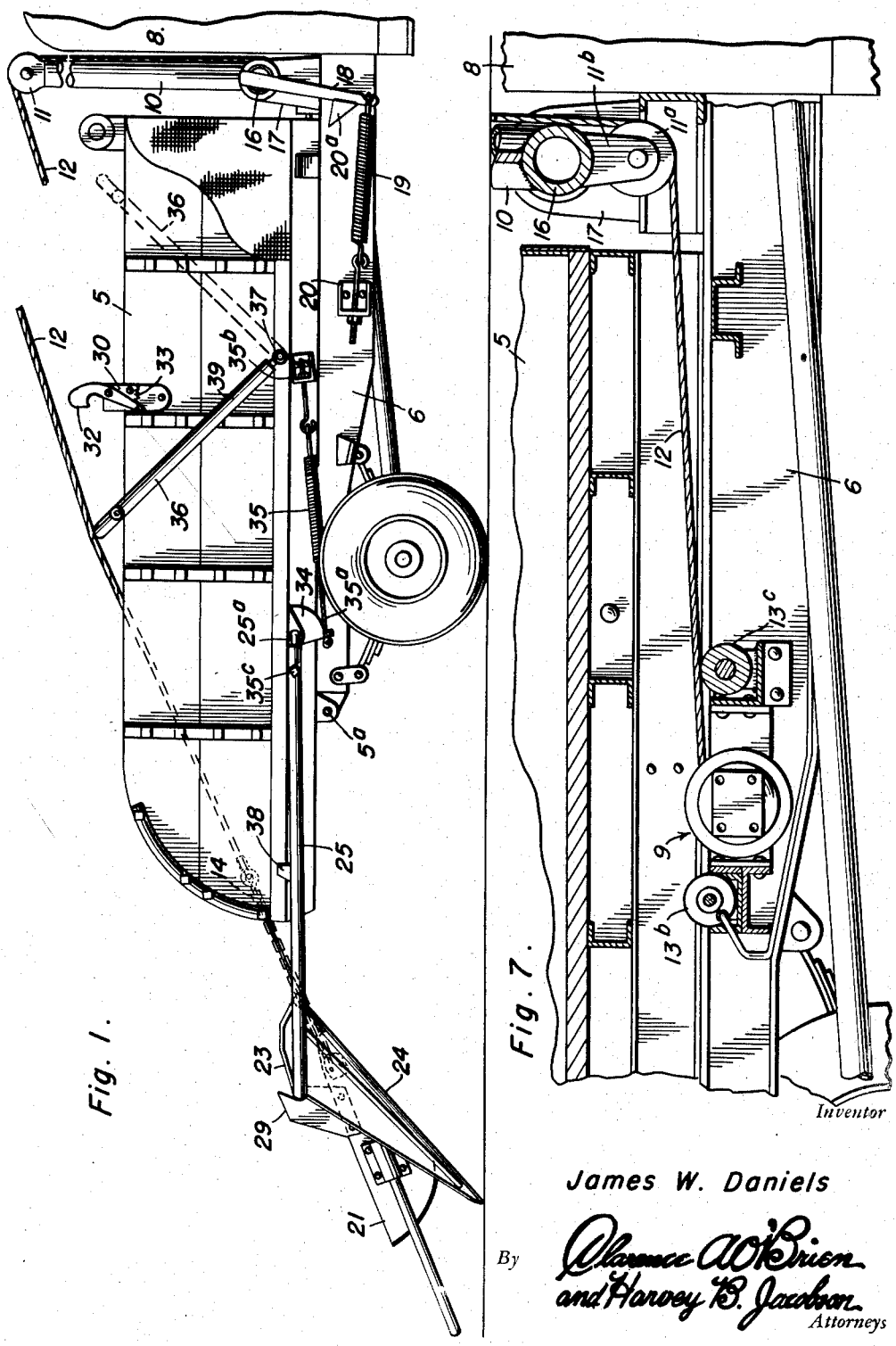
Inventor
James W. Daniels
By *Clarence A. O'Brien and Harvey B. Jacobson*
Attorneys

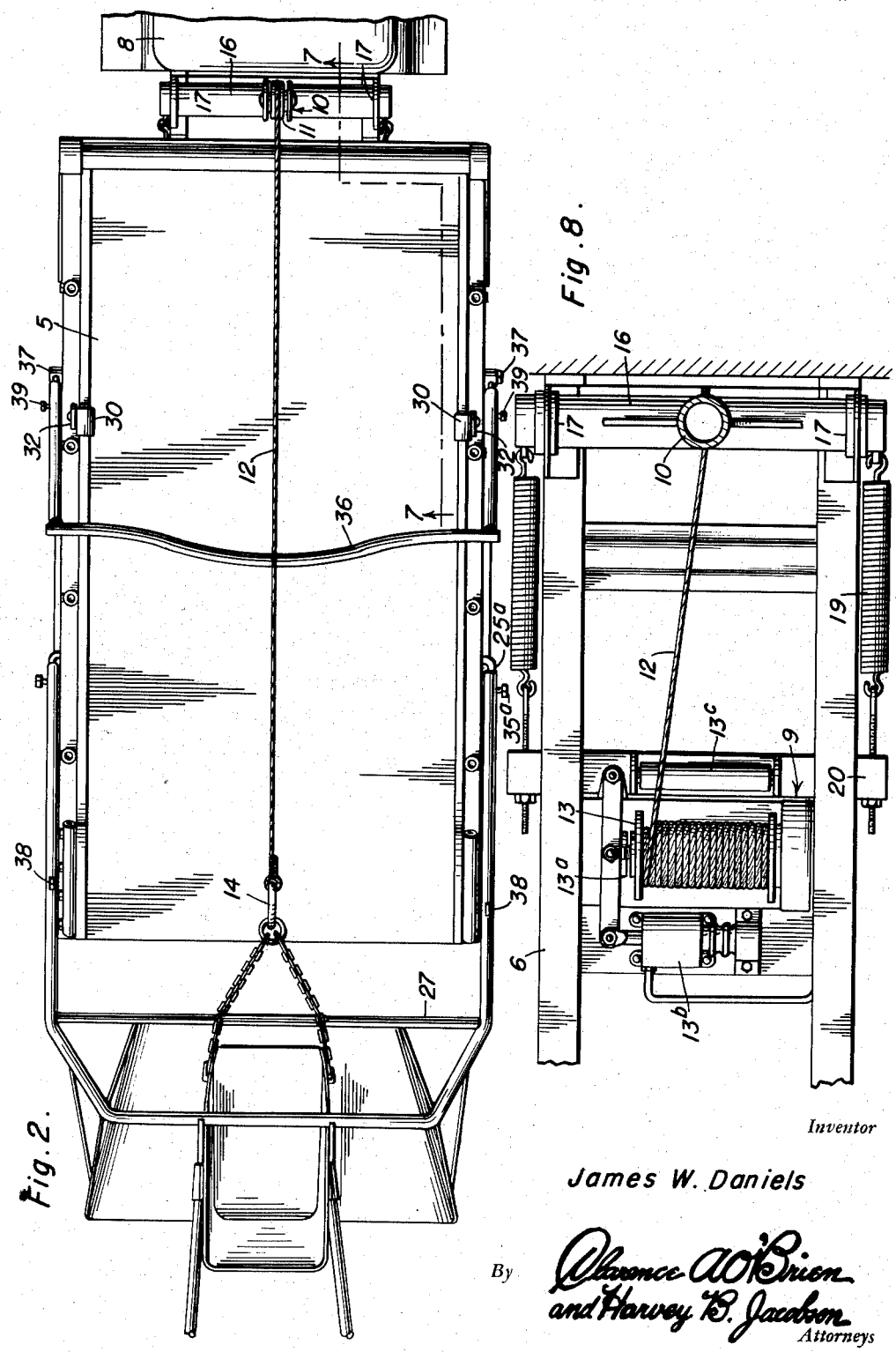

Nov. 20, 1951  J. W. DANIELS  2,576,001
SELF-LOADING AND UNLOADING AUTO TRUCK
Filed Jan. 25, 1949  4 Sheets-Sheet 3
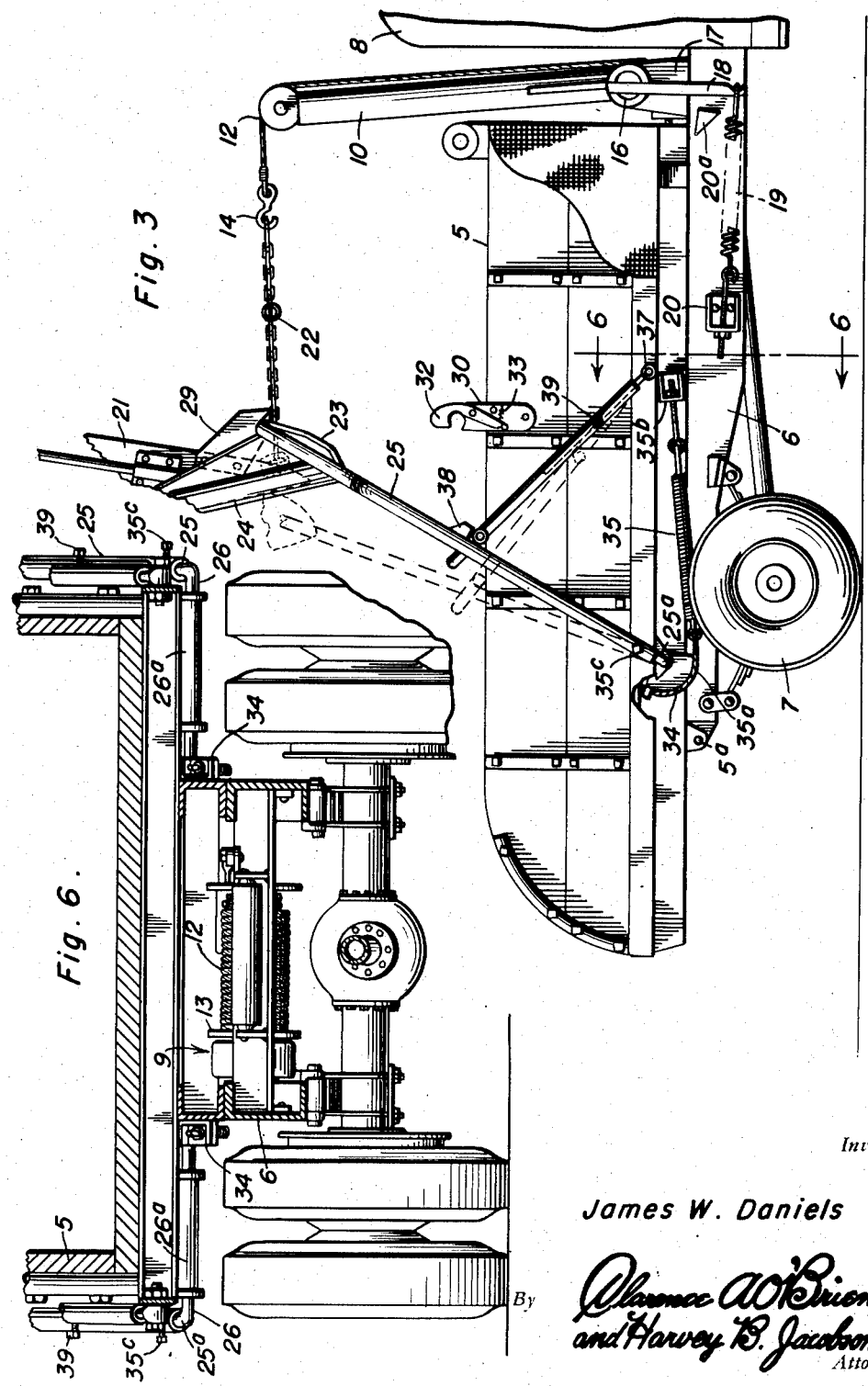
Inventor
James W. Daniels Nov. 20, 1951  J. W. DANIELS  2,576,001
SELF-LOADING AND UNLOADING AUTO TRUCK
Filed Jan. 25, 1949  4 Sheets-Sheet 4
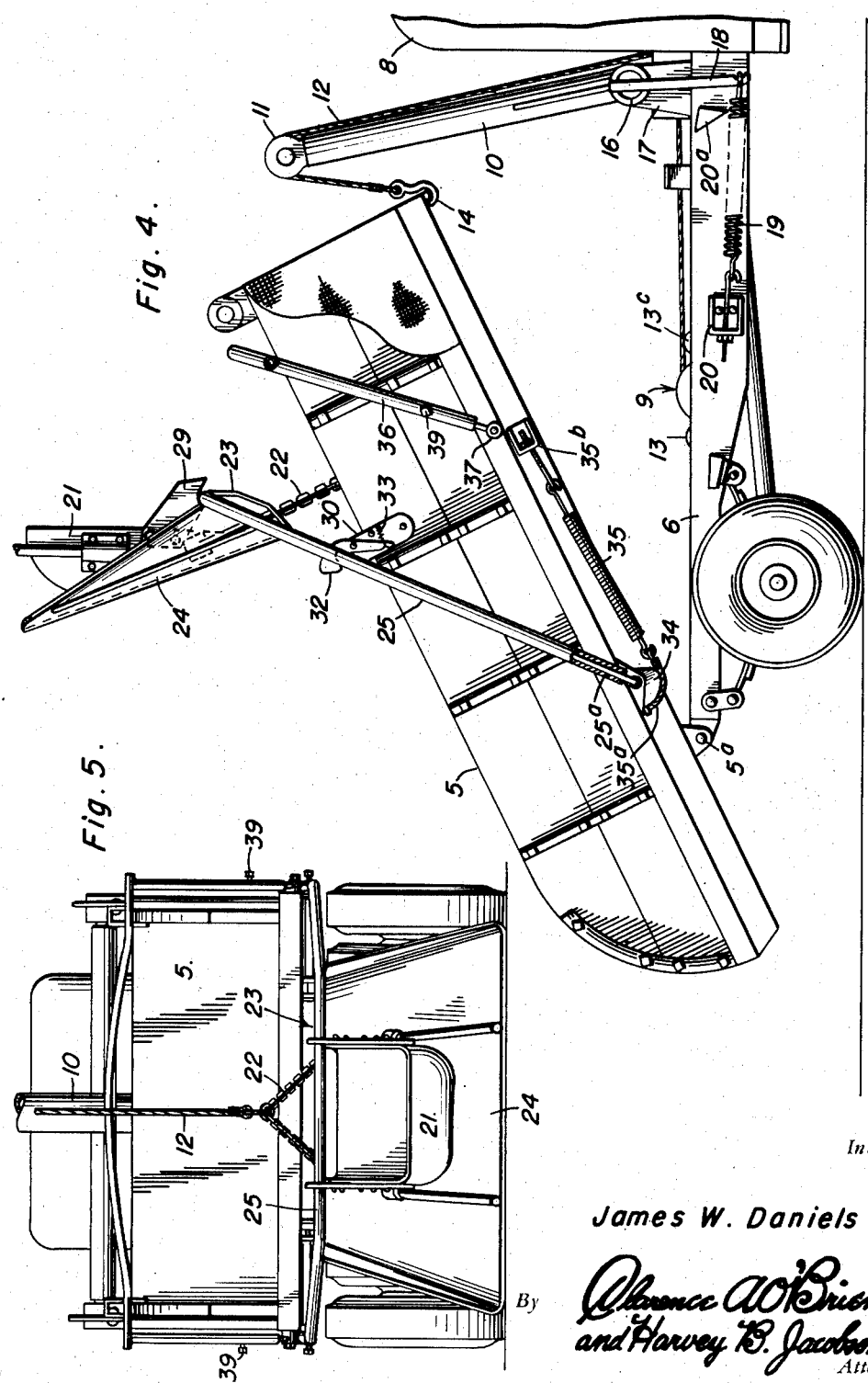
Inventor
James W. Daniels Patented Nov. 20, 1951

2,576,001

UNITED STATES PATENT OFFICE 2,576,001

SELF-LOADING AND UNLOADING AUTO TRUCK

James W. Daniels, Fort Myers, Fla.

Application January 25, 1949, Serial No. 72,608

11 Claims. (Cl. 214—92)

This invention relates to a self-loading and unloading vehicle, such as an auto truck having a dump body, in combination with a shovel-type drag scoop for scooping up material from the ground and moving it to the vehicle, and means for elevating the filled scoop and dumping its contents into the vehicle body.

The present application is a continuation-in-part, of my prior application for U. S. Letters Patent Serial No. 52,677, filed October 4, 1948, now abandoned.

An object of the present invention is to provide a self-loading and unloading vehicle of the above kind which is simple and durable in construction, easy to use, and efficient in operation.

Another object is to provide a vehicle loading apparatus of the above kind, wherein a drag line operated by the vehicle power plant is used to fill the scoop and move it onto a scoop receiver and carrier which, on further pull on the drag line, is swung with the filled scoop thereon to a dumping position above the vehicle body, and wherein the scoop receiver and carrier and the empty scoop are returned automatically to scoop receiving position when the drag line is slackened.

Another object is to provide means adjustable longitudinally of the truck body to limit the swinging movement of the carrier to different dumping positions and thereby distribute the material dumped into the body longitudinally of the latter.

A further object is to provide for jarring or jolting the scoop in dumping position to release the scoop load from the scoop in the handling of sticky material or the like.

A still further object is to provide means for limiting the swinging movement of the receiver and carrier as described above, which means is movable to inoperative position so that the scoop receiver and carrier can be swung forwardly to and latched in a transporting position.

Another object is to provide novel and efficient means for mounting the scoop carrier on the vehicle body.

Still another object is to provide a loading apparatus of the above kind in which the drag line runs over a mast at the forward end of the vehicle body, in order to obtain maximum effectiveness in swinging the scoop and its receiver and carrier to dumping position, and to enable use of the mast and drag line as a hoist for tilting the body to dumping position.

Still another object is to reduce the height of the mast necessary for hoisting by pivoting it on a transverse axis, and at the same time to provide means for preventing the mast from swinging against the vehicle body during hoisting.

The nature of the present invention will be better understood from the following description of its embodiment in an auto dump truck, when considered in connection with the accompanying drawings in which:

Figure 1 is a fragmentary side elevational view, partly broken away, of an auto dump truck embodying the present invention, the scoop receiver and carrier being in scoop receiving position with the scoop thereon;

Figure 2 is a top plan view thereof;

Figure 3 is a view similar to Figure 1 with the scoop and the receiver and carrier in a dumping position;

Figure 4 is a view similar to Figure 3 with the scoop and receiver and carrier latched in extreme upwardly and forwardly swung transporting position, and with the truck body tilted to dump its load;

Figure 5 is a rear elevational view of the construction shown in Figure 1;

Figure 6 is an enlarged fragmentary vertical transverse section taken on the line 6—6 of Figure 3;

Figure 7 is an enlarged fragmentary vertical longitudinal section taken substantially on the line 7—7 of Figure 2;

Figure 8 is a fragmentary plan view of the construction shown in Figure 7, with the truck body omitted.

Referring in detail to the drawings, the present invention is illustrated in connection with a conventional auto dump truck having a dump body 5 which is pivoted at 5a to the rear end of the chassis frame 6. The truck has rear driving wheels 7, a driver's cab 8, and a winch assembly 9 mounted within the chassis frame 6 intermediate the ends of the latter and suitably driven from the truck power plant through a conventional power take-off, not shown. A braced mast 10 is mounted on the frame 6 between the truck body 5 and the cab 8, and this mast has a guide pulley 11 journaled on the upper end thereof in line therewith. A drag line or cable 12, wound on the winch drum 13, passes forwardly around a pulley 11a journaled in the lower end of an arm 11b rigid with and depending from the pivot shaft of mast 10. This drag line or cable extends from pulley 11a upwardly in front of the mast 10 over pulley 11 and has a hook or the like 14 at its free end for connecting it to the bottom of the front end of truck body 5, whereby the latter may be tilted to dumping position upon winding the cable upon the drum 13, as shown in Figure 4. Drum 13 may be thrown into and out of operation by means of a clutch at 13a which may be operated by a suction motor 13b suitably controlled from the driver's seat in the cab 8. A guide roller 13c is preferably journaled directly in front of the drum 13 for having the line or cable 12 pass thereover. The mast 10 is fixed at its lower end to a shaft 16 disposed transversely of the vehicle frame 6 and journaled near its ends in bearing brackets 17 secured on said frame 6, whereby the mast may tilt rearwardly as the front end of the body 5 is raised to dump the load thereof. Yieldable means is provided to swing the mast to a vertical position, such means including depending arms 18 secured on the ends of shaft 16, and helical tension springs 19 connecting the arms 18 to brackets 20 fixed to opposite sides of the vehicle frame 6 rearwardly of said arms. The forward swinging of mast 10 is limited to prevent it from contacting the cab 8, by means of stop members 20a fixed to the sides of the vehicle frame 6 in the path of the arms 18.

The pivoting of mast 10 as described above permits a reduction in the mast height required to hoist the front end of the body to the dumping position shown in Figure 4, as compared with the height that would be necessary if the mast were fixed in a vertical position. The weight of the body on the hook 14 tends to swing the mast on its pivot axis and to pull it rearwardly against the body, but this tendency is counteracted by the combined tension of the springs 19 and the pull of the cable on the lower end of the mast. Thus, the mast tilts only to the extent necessary to establish and maintain equilibrium of these forces about the pivot axis, and proper proportioning of the parts in relation to the tension of the springs keeps the mast always in a tilted position with the pulley 11 more or less directly above the hook 14. In swinging the scoop and the scoop receiver and carrier to dumping position as hereinafter described, however, the mast may swing slightly to the rear until it comes into contact with and is supported by the front end of the truck body. Since the cable or drag line 12 runs down the forward side of the mast, it always runs free without contacting the truck body.

Means is provided for scooping up material at various points rearwardly of the truck, dragging it to a point near the rear end of the truck body, and discharging it into the latter. This means includes a conventional drag or scraper scoop 21 of the shovel-type having a bridle 22 or the like adapted for connection with the cable 12 so that the latter may be used as a drag line for said scoop. A scoop receiver and carrier 23 having a scoop receiving ramp 24 is pivotally mounted on the truck body between the ends of the latter for vertical swinging movement, so that the ramp is movable between a rearwardly and downwardly swung ground engaging and scoop receiving position at the rear of the truck body as shown in Figure 1, and upwardly and forwardly swung scoop dumping positions over the truck body as shown in Figure 3. The scoop receiver and carrier includes a suitably braced U-shaped frame 25 made of tubular members and having its ends telescoped onto crank arms 25a of transverse shafts 26 journaled in bearings 26a mounted on the underside of the bed of truck body 5. The frame 25 is of a size to project beyond the rear end of the truck body when the scoop receiver and carrier is in its scoop receiving position, and a transverse brace bar 27 connects the legs or end portions of frame 25 near the intermediate or bight portion of the latter.

The ramp 24 is rigidly carried by the free or rear end portion of the frame 25 and is disposed obliquely of the latter, as well as extended beyond the free end of the same, whereby said ramp is rearwardly inclined when in scoop receiving position. As shown, the ramp is made of sheet metal and shaped to guide the scoop thereon, although the scoop may approach the ramp at a considerable angle on either side of the fore and aft line of the body. To this end, the sides of the ramp flare outwardly to and, at its ground engaging edge, the ramp has approximately the same width as the body itself. Thus, the drag scoop can be started at any point in a fairly large range on either side of the fore and aft line of the vehicle body and still be pulled onto the ramp.

As shown, the scoop 21 has hooks 29 fixed on the sides thereof intermediate the front and rear of the same in position to engage over the bight or intermediate portion of frame 25 when the scoop has been fully dragged onto the ramp. In this way, the scoop is automatically connected to the scoop receiver and carrier when dragged onto the ramp, so that continued pull on the cable 12 causes upward and forward swinging of the scoop and the scoop receiver and carrier to bring the scoop into dumping position over the truck body. The hooks 29 form abutments which engage the bight portion of frame 25 to limit movement of the scoop onto the ramp, and the scoop engages under said bight portion of frame 25 in this position so as to be held against movement relative to the ramp, whereby to insure tilting of the scoop to dumping position when swung with the scoop receiver and carrier over the truck body. In other words, engagement of the scoop under the bight portion of frame 25 prevents the forward end of said scoop from being swung by pull of cable 12 forwardly from the ramp when said scoop is swung with the receiver and carrier over the truck body, thereby causing the scoop to be tilted or overturned to dumping position.

Fixed on the sides of the truck body are stop brackets 30 for limiting forward movement of the scoop receiver and carrier to transporting position at a point considerably forward of the pivotal axis thereof as shown in Figure 4, said brackets being notched to receive the brace bar 27. Pivoted latches 32 are carried by the brackets 30 in position to engage over the bar 27 for automatically latching the receiver and carrier at its forward limit of movement over the truck body, said latches being urged to latching position by springs 33.

The hooks 29 are located well forwardly on the upper edges of the scoop but slightly to the rear of the point of connection of the bridle 22 thereto. Referring to Figure 3, it will be seen that the bight portion of frame 25 acts as a fulcrum under which the scoop tends to turn by virtue of the pull of the cable on the front end of the scoop. Such turning or tilting of the scoop is prevented by engagement of the bottom of the scoop with the ramp 24. If the hooks 29 were moved farther back, the effect would be to increase the pressure on the relatively light sheet metal ramp and the stresses in the sides of the scoop, and these effects would be especially serious because of the fact that the pull of the cable 12 must be great enough to overcome the strong springs described hereinafter which return the receiver and carrier to scoop receiving position. Thus, it is advantageous to move the hooks 29 forwardly close to the line of pull of the cable in dumping position. On the other hand, the center of gravity of the empty scoop in the transporting position of Figure 4 is sufficiently to the rear of the frame 25 to keep the scoop securely in place. The location of the hooks on the upper scoop edges away from the ramp 24 permits this result to be obtained with a suitable inclination of the ramp 24 when in scoop receiving position.

In order to make the loading operation as nearly automatic as possible, suitable resilient means are provided for automatically returning the scoop and the scoop receiver and carrier to the position shown in Figure 1 whenever the cable 12 is slackened. Hence, the operator needs only to haul in continuously on the drag line by means of the winch 13 until the load is dumped, and then to release the drag line by disengaging the clutch 13a, whereupon the ramp 24 with the empty scoop thereon returns promptly to its ground engaging position. In the form shown, the inner ends of the shafts 26 have reel segments 34 secured thereon, and tension springs 35 are connected thereto by short lengths of cable 35a arranged to wrap around said reel segments. The springs 35 are anchored to brackets 35b attached to the sides of the bed of truck body 5. The arrangement is such that when the scoop receiver and carrier is swung upwardly and forwardly, the springs 35 are placed under tension and the lengths of cable 35a are caused to wrap around the reel segments. When the pull on cable 12 is released, the springs 35 which have thus been placed under tension cause the swinging of the scoop receiver and carrier rearwardly and downwardly to scoop receiving position. Set screws 35c secure the ends of frame 25 on the crank arms 25a.

The rapidity with which the scoop receiver and carrier is swung upwardly to dumping position is under the control of the operator. If the swinging movement is slow, the contents of the scoop may begin to spill out gradually near the rear end of the truck and continue until the receiver and carrier and the scoop are brought to a stop, when any remaining contents are dumped. As a rule, however, it is desirable to swing the receiver and carrier rather rapidly and to provide stop means for limiting its swinging movement short of the stop brackets 30. Most of the scoop load then remains in the scoop until it is brought abruptly to a stop, when the load is released by the jar of engagement with the stop means. In case of materials which do not flow freely from the scoop, the drag line can be slackened off somewhat and then hauled in again to jolt the scoop repeatedly until its load is released. Preferably the stop means is adjustable longitudinally of the body so that the location of the dumping position can be adjusted accordingly and the load thus distributed in and longitudinally of the truck body.

In the form shown, the stop means includes a bail 36 having its ends pivoted at 37 to the sides and at the bottom of the truck body 5 considerably forwardly of the pivotal axis of the scoop receiver and carrier 23, whereby said bail 36 may be swung rearwardly to an operative position as shown in Figures 1 and 3, or forwardly to an inoperative position as shown in Figure 4. The operative position of the bail can be adjusted longitudinally of the truck body by adjusting the length of its sides or legs which may suitably comprise telescoping sections latched in adjusted relative positions by means of set screws 39 or the like. In either position, the bail 36 rests upon the upper edges of the side walls of the truck body and is in the path of the arms of frame 25. The arms or end portions of frame 25 are provided intermediate their ends with stop lugs 38 arranged to engage over the bail 36 when the scoop is brought to dumping position over the truck body and before it reaches the latches 32. The lugs 38 prevent any tendency of the bail 36 to swing upwardly and forwardly so that said bail 36 effectively stops the scoop receiver and carrier in swinging forwardly. When the bail 36 is swung forwardly to the position of Figure 4, it is out of the path of the scoop receiver and carrier and permits the latter to continue forwardly until engaged by the latches 32.

It will be noted that when the scoop has been dragged onto the ramp 24, the pull on the cable 12 from the scoop to the pulley 11 is transmitted to the bight portion of the frame 25 which is engaged over the scoop. Thus, the effective line of pull is raised with respect to the pivotal axis of the receiver and carrier to provide an effective torque arm. The engagement of the bight portion of frame 25 over the scoop holds the latter down on the ramp and prevents the front end of the scoop from pulling away from the ramp when swung upwardly over the truck body, whereby the scoop is tilted or overturned to dump its contents into the truck body.

In operation, the truck is parked in load receiving position ahead of the material to be loaded, and the scoop and its receiver and carrier are swung rearwardly to the position of Figure 1 after unlatching said receiver and carrier and upon paying the cable 12 out from the drum 13. The scoop may be pulled off of the ramp and moved rearwardly away from the truck to the material to be loaded. Winding of cable 12 on drum 13 then drags the scoop through the material to be loaded and onto the ramp 24, and then swings the loaded scoop and its receiver and carrier upwardly and forwardly so as to dump the contents of the scoop into the truck body. The cable 12 is then slackened and springs 35 swing the scoop and its receiver and carrier back to the position of Figure 1. This operation is repeated until the truck body is loaded to the desired extent, whereupon the scoop and its receiver and carrier are latched in the position of Figure 4 by simply swinging the bail 36 forwardly to its inoperative position and swinging the scoop receiver and carrier forwardly until its cross bar 27 is engaged by the latches 32. One man on the ground can handle the scoops for a number of trucks, since it is only necessary to properly place the scoops in the material to be loaded and allow them to be dragged through such material and onto the ramp without manually guiding them. The trucks may then be satisfactorily driven to the point where the loads thereof are to be dumped, whereupon the cable 12 of each truck is connected to the truck body and wound on the drum 13 to tilt said truck body to dumping position as shown in Figure 4. After the load has been dumped from the truck body, the latter is returned to load receiving and transporting position so that the truck may be returned to the original point for reception of a new load.

From the foregoing description, it is believed that the construction, operation and advantages of the present invention will be readily understood and appreciated by those skilled in the art. Modifications and changes in details of construc- Having described the invention, what is claimed as new is:

1. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier transverse shafts journaled on the underside of the body at opposite sides of the latter and having crank arms on their outer ends, said receiver and carrier including a tubular U-shaped frame having its ends removably telescoped over and secured on said crank arms, and tension springs connected to the inner ends of said transverse shafts to cause swinging the receiver and carrier rearwardly to scoop receiving position.

2. The combination with an auto dump truck having a body tiltable to dumping position and including means to tilt said body to dumping position, said means including a mast pivoted on the truck in front of the body for rearward tilting movement and provided at the top with a guide pulley, a winch including a drum driven from the truck power plant and having a cable wound thereon and detachably connected to the truck body, yieldable means to swing the mast forwardly to a substantially vertical position upon returning the truck body from dumping position to load receiving position, a scoop adapted to have the cable connected thereto when detached from the truck body, a receiver and carrier pivoted for vertical swinging movement on the truck body between the ends of the latter and including a ramp onto which the scoop is adapted to be dragged by said cable, and means to connect the scoop to the receiver and carrier when dragged onto said ramp so that continued winding of the cable onto the drum will swing the receiver and carrier to bring and tilt the scoop to dumping position over the truck body.

3. In combination, a vehicle equipped with a power plant and having a body to be loaded, a drag scoop, a drag line connected to the scoop and operated by the vehicle power plant to drag the scoop through material to be loaded and toward the vehicle, a scoop receiver and carrier positionable to receive the filled scoop as it approaches the vehicle and pivoted to the vehicle to swing upwardly and forwardly from its scoop receiving position to a dumping position over the vehicle body, said receiver and carrier having a retaining means into which the scoop is pulled and by which it is secured to the receiver and carrier against separation from the latter as the same is swung in dumping position, whereby a continuous pull on the drag line fills the scoop and drags it onto the receiver and carrier and causes the scoop and the receiver and carrier to swing as a unit to elevate and overturn the scoop so as to dump its contents into the vehicle body, the receiver and carrier being pivoted at a point forwardly of and remote to the rear end of the vehicle body substantially at the level of the floor of the latter, said receiver and carrier including a frame that extends substantially horizontally when the receiver and carrier is in scoop receiving position, and a ramp rigid with the frame and disposed to incline rearwardly from a point rearwardly of the vehicle and short of the rear end of the frame to a point on the ground rearwardly of the rear end of the frame when said receiver and carrier is in said scoop receiving position.

4. Means for loading a vehicle having a power plant, comprising a drag scoop and a drag line therefor operable from the vehicle power plant, a scoop receiver and carrier swingable with the scoop thereon between a scoop receiving position and a scoop dumping position over the vehicle body, means connecting said receiver and carrier and the scoop thereon for unitary swinging movement, stop means for limiting the swinging movement of said receiver and carrier when pulled to dumping position by said drag line, and resilient means for swinging said receiver and carrier to scoop receiving position, said stop means being adjustable longitudinally of the vehicle body for distribution of the load therein, said stop means comprising a bail-like member extending across the vehicle body and having extensible arms pivoted on opposite sides of said body, said receiver and carrier having lugs arranged to project over said bail-like member for locking engagement therewith in dumping position.

5. Means for loading a vehicle having a power plant comprising a drag scoop and a drag line therefor operable from the vehicle power plant, a scoop receiver and carrier swingable with the scoop thereon between a scoop receiving position and a scoop dumping position over the vehicle body, scoop retaining means on said receiver and carrier automatically engageable by the filled scoop when said drag line pulls it onto said receiver and carrier to connect said receiver and carrier and scoop for unitary swinging movement, stop means for limiting the swinging movement of said receiver carrier to dumping position on further pull on said drag line, and resilient means for swinging said receiver and carrier to scoop receiving position, said receiver and carrier having a scoop receiving ramp substantially wider than the scoop in a direction transverse to the movement of the scoop as it approaches said ramp, said scoop retaining means being automatically engageable by the filled scoop at any point within the transverse dimensions of said ramp, said scoop retaining means comprising a hold down member extending transversely above said ramp, the upper forward portion of said scoop having connecting means engageable with said member when the drag line pulls the scoop onto said ramp and under said member.

6. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier, said retaining means comprising a member transverse to and spaced above the ramp, said drag line being connected to the front end of the scoop to pull it between said member and said ramp, and means on the scoop to engage said member comprising laterally spaced hook like projections on the upper forward portion of the scoop but to the rear of the point of connection of the drag line to the scoop.

7. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier, said retaining means comprising a member transverse to and spaced above the ramp, said drag line being connected to the front end of the scoop to pull it between said member and said ramp, and means on the scoop to engage said member comprising laterally spaced hook like projections on the upper forward portion of the scoop but to the rear of the point of connection of the drag line to the scoop, said receiver and carrier with the scoop thereon being swingable beyond dumping position to a forwardly inclined transporting position, the center of gravity of the empty scoop when in said transporting position being to the rear of the points of engagement of said projections with said member.

8. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier, said retaining means comprising a member transverse to and spaced above the ramp, said drag line being connected to the front end of the scoop to pull it between said member and said ramp, and means on the scoop to engage said member comprising laterally spaced hook like projections on the upper forward portion of the scoop but to the rear of the point of connection of the drag line to the scoop, said receiver and carrier comprising arms extending approximately horizontally to the rear from the pivot axis on opposite sides of the body and beyond its rear end when said ramp is in scoop receiving position, said ramp being carried by said arms behind the body to clear the rear end wall thereof as it swings upwardly to dumping position.

9. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier, said retaining means comprising a member transverse to and spaced above the ramp, said drag line being connected to the front end of the scoop to pull it between said member and said ramp, and means on the scoop to engage said member comprising laterally spaced hook like projections on the upper forward portion of the scoop but to the rear of the point of connection of the drag line to the scoop, said receiver and carrier comprising arms extending approximately horizontally to the rear from the pivot axis on opposite sides of the body and beyond its rear end when said ramp is in scoop receiving position, said ramp being carried by said arms behind the body to clear the rear end wall thereof as it swings upwardly to dumping position, said arms extending rearwardly beyond said ramp and cross-connected at their ends above the ramp to provide a retaining member for the scoop, said drag line running between the cross-connection and the ramp to the front end of the scoop to pull it up the ramp and underneath said cross-connection.

10. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier, said retaining means comprising a member transverse to and spaced above the ramp, said drag line being connected to the front end of the scoop to pull it between said member and said ramp, and means on the scoop to engage said member comprising laterally spaced hook like projections on the upper forward portion of the scoop but to the rear of the point of connection of the drag line to the scoop, said receiver and carrier comprising arms extending approximately horizontally to the rear from the pivot axis on opposite sides of the body and beyond its rear end when said ramp is in scoop receiving position, said ramp being carried by said arms behind the body to clear the rear end wall thereof as it swings upwardly to dumping position, said arms extending rearwardly beyond said ramp and cross-connected at their ends above the ramp to provide a retaining member for the scoop, said drag line running between the cross-connection and the ramp to the front end of the scoop to pull it up the ramp and underneath said cross-connection, said scoop having hook-like projections from the upper edges of its sides adapted to engage said cross-connection and limit movement of the scoop up the ramp, said projections being located adjacent but to the rear of the point of connection of the drag line to the scoop.

11. In a self-loading vehicle, a truck having a body, a scoop receiver and carrier pivoted for vertical swinging movement on the truck body between the ends of the latter, a scoop, means including a drag line for dragging the scoop toward the truck onto the receiver and carrier and for then swinging the scoop and the receiver and carrier upwardly and forwardly to bring the scoop over the truck body in tilted dumping position, means for limiting the forward swinging movement of the scoop receiver and carrier, and means including a stop member movable into the path of said receiver and carrier to stop it in scoop dumping position before reaching said limiting means, said stop member being movable out of the path of said receiver and carrier, said retaining means comprising a member transverse to and spaced above the ramp, said drag line being connected to the front end of the scoop to pull it between said member and said ramp, and means on the scoop to engage said member comprising laterally spaced hook like projections on the upper forward portion of the scoop but to the rear of the point of connection of the drag line to the scoop, said receiver and carrier comprising arms extending approximately horizontally to the rear from the pivot axis on opposite sides of the body and beyond its rear end when said ramp is in scoop receiving position, said ramp being carried by said arms behind the body to clear the rear end wall thereof as it swings upwardly to dumping position, said arms extending rearwardly beyond said ramp and cross-connected at their ends above the ramp to provide a retaining member for the scoop, said drag line running between the cross-connection and the ramp to the front end of the scoop to pull it up the ramp and underneath said cross-connection, said scoop having hook-like projections from the upper edges of its sides adapted to engage said cross-connection and limit movement of the scoop up the ramp, said projections being located adjacent but to the rear of the point of connection of the drag line to the scoop, said ramp and cross-connection extending the full width of the body and being substantially wider than said scoop.

JAMES W. DANIELS.

REFERENCES CITED

The following references are of record in the file of this patent:

UNITED STATES PATENTS

| Number | Name | Date |
|---|---|---|
| 1,309,054 | Albrecht | July 8, 1919 |
| 1,455,689 | Weidinger | May 15, 1923 |
| 1,492,419 | Brackett | Apr. 29, 1924 |
| 1,506,762 | Manierre | Sept. 2, 1924 |
| 1,819,578 | Watt | Aug. 18, 1931 |
| 1,896,293 | Downie | Feb. 7, 1933 |
| 2,144,246 | Long | Jan. 17, 1939 |
| 2,170,932 | Venema | Aug. 29, 1939 |
| 2,234,599 | Johnston | Mar. 11, 1941 |
| 2,296,085 | Boldt | Sept. 15, 1942 |
| 2,453,943 | Smith | Nov. 16, 1948 |
| 2,504,476 | Volk | Apr. 18, 1950 |